United States Patent
Nelson et al.

(10) Patent No.: US 12,540,765 B2
(45) Date of Patent: Feb. 3, 2026

(54) FREE COOLING OPERATION OF A CHILLER

(71) Applicant: Johnson Controls Tyco IP Holdings LLP, Milwaukee, WI (US)

(72) Inventors: Cameron S. Nelson, Glen Rock, PA (US); William L. Kopko, Jacobus, PA (US); David A. Bradshaw, Timonium, MD (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 51 days.

(21) Appl. No.: 18/027,901

(22) PCT Filed: Sep. 21, 2021

(86) PCT No.: PCT/US2021/051356
§ 371 (c)(1),
(2) Date: Mar. 22, 2023

(87) PCT Pub. No.: WO2022/066663
PCT Pub. Date: Mar. 31, 2022

(65) Prior Publication Data
US 2023/0375240 A1    Nov. 23, 2023

Related U.S. Application Data

(60) Provisional application No. 63/081,565, filed on Sep. 22, 2020.

(51) Int. Cl.
*F25B 49/02* (2006.01)
*F25B 1/04* (2006.01)

(52) U.S. Cl.
CPC .............. *F25B 49/02* (2013.01); *F25B 1/04* (2013.01)

(58) Field of Classification Search
CPC .......... F25B 49/022; F25B 49/02; F25B 1/04; F25B 31/026; F25B 2309/004;
(Continued)

(56) References Cited

U.S. PATENT DOCUMENTS 8,104,298 B2 * 1/2012 Sishtla ................. F04D 29/059
                                                            62/84
9,179,580 B2   11/2015 Tozer
(Continued)

FOREIGN PATENT DOCUMENTS

CN         101126395 A      2/2008
CN         101688713 A      3/2010
(Continued)

OTHER PUBLICATIONS

Vertiv Liebert AFC The Adiabatic Freecooling Solution with Top-Tier Availability (Year: 2019).*
(Continued)

*Primary Examiner* — Frantz F Jules
*Assistant Examiner* — Devon Moore
(74) *Attorney, Agent, or Firm* — Fletcher Yoder, P.C.

(57) ABSTRACT

A heating, ventilation, air conditioning, and/or refrigeration (HVAC&R) system (10) includes a vapor compression system (14) having an evaporator (38), a condenser (34), and a compressor (32). The compressor (34) is configured to guide a refrigerant therethrough in a normal operating mode of the vapor compression system (14) and in a free cooling mode of the vapor compression system (14). The HVAC&R system (10) also includes a controller (40) configured to enable supply of power to a motor (50) of the compressor (34) in the normal operating mode and to suspend supply of power to the motor (50) of the compressor (34) in the free cooling mode.

20 Claims, 7 Drawing Sheets

(58) Field of Classification Search
CPC .......... F25B 2600/02; F25B 2600/0253; F25B 2700/21; F25B 2700/2106; F04D 29/058; F04D 29/059
See application file for complete search history.

(56) References Cited

U.S. PATENT DOCUMENTS

| | | | |
|---|---|---|---|
| 10,215,186 B1 * | 2/2019 | Wagner | ............... F04D 29/4206 |
| 10,858,951 B2 * | 12/2020 | Hasegawa | ............... F25B 1/053 |
| 2010/0023166 A1 | 1/2010 | Chessel et al. | |
| 2010/0036531 A1 | 2/2010 | Chessel et al. | |
| 2012/0125023 A1 | 5/2012 | Kopko et al. | |
| 2017/0009775 A1 | 1/2017 | Arnou | |
| 2018/0038617 A1 | 2/2018 | Knopp et al. | |
| 2023/0184219 A1 * | 6/2023 | Choi | ..................... F04D 29/051 415/121.3 |

FOREIGN PATENT DOCUMENTS

| | | | |
|---|---|---|---|
| CN | 104697226 A | 6/2015 | |
| CN | 105241130 A | 1/2016 | |
| CN | 105765234 A | 7/2016 | |
| CN | 110030752 A | 7/2019 | |
| KR | 20150110015 A | 10/2015 | |
| TW | 201314048 A | 4/2013 | |
| WO | WO-2014193238 A1 * | 12/2014 | ........... F04D 13/086 |
| WO | 2017203317 A1 | 11/2017 | |

OTHER PUBLICATIONS

International Search Report and Written Opinion for PCT Application No. PCT/US2021/051356, mailed Jan. 11, 2022, 12 pages.
European Extended Search Report for EP Application No. 21873292.3, dated Apr. 4, 2024, 9 pages.

* cited by examiner

FREE COOLING OPERATION OF A CHILLER

CROSS-REFERENCE SECTION

This application is a U.S. National Stage Application of PCT International Application No. PCT/US2021/051356, entitled "FREE COOLING OPERATION OF A CHILLER," filed Sep. 21, 2021, which claims priority to and the benefit of U.S. Provisional Application Ser. No. 63/081,565, entitled "FREE COOLING OPERATION OF A CHILLER," filed Sep. 22, 2020, each of which is hereby incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

This application relates generally to chiller systems and, more particularly, to free cooling operation of chiller systems.

Chiller systems, or vapor compression systems, utilize a working fluid (e.g., a refrigerant) that changes phases between vapor, liquid, and combinations thereof in response to exposure to different temperatures and pressures within components of the chiller system. The chiller system may include an evaporator configured to place the working fluid (e.g., the refrigerant) in a heat exchange relationship with a conditioning fluid (e.g., water), such that the working fluid absorbs heat from the conditioning fluid. The conditioning fluid, cooled by the working fluid, may then be delivered to conditioning equipment and/or a conditioned environment serviced by the chiller system. In such applications, the conditioning fluid may be passed through downstream equipment, such as air handlers, to condition other fluids, such as air in a building.

In certain chiller systems, a cooling fluid (e.g., water) may additionally or alternatively be used to cool the working fluid. For instance, the chiller system may include a cooling tower (or other water or cooling fluid source) configured to provide the cooling fluid to a condenser of the chiller system. The cooling fluid may be cooled in the cooling tower (or other water or cooling fluid source) via ambient air, and the condenser may place the cooling fluid from the cooling tower in a heat exchange relationship with the refrigerant to transfer heat from the refrigerant to the cooling fluid. A compressor may be positioned between the condenser and the evaporator and may be powered to adjust a pressure of the refrigerant and circulate the refrigerant between the components of the chiller system.

In certain systems, free cooling operations may be activated during certain conditions, such as when ambient air temperature is relatively low (e.g., in the spring, winter, and/or fall seasons). When the ambient air temperature is relatively low, a cooling demand of the chiller may be reduced and/or operating conditions may enable the chiller to operate at an adequate cooling capacity without powering the compressor. For example, because the cooling fluid provided by the cooling tower may have a relatively low temperature when the ambient temperature of outside air is relatively low, the chiller system may operate to cool the conditioning fluid at an adequate capacity without powering the compressor. In traditional chiller systems utilizing free cooling, power to a compressor of the chiller system may be terminated, and the refrigerant may be directed to circumvent the compressor via a compressor bypass valve or the like. In traditional systems employing free cooling, directing the refrigerant to circumvent the compressor may avoid pressure losses that would otherwise reduce cooling capacity of the chiller system. However, it is now recognized that traditional or conventional chiller systems utilizing traditional or conventional free cooling techniques may include extraneous components (e.g., the compressor bypass valve) that contribute to a part count and cost of the system, may be limited in the types of refrigerants that can be used, and may be improved upon in terms of available cooling capacity.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, air conditioning, and/or refrigeration (HVAC&R) system includes a vapor compression system having an evaporator, a condenser, and a compressor. The compressor is configured to guide a refrigerant therethrough in a normal operating mode of the vapor compression system and in a free cooling mode of the vapor compression system. The HVAC&R system also includes a controller configured to enable supply of power to a motor of the compressor in the normal operating mode and to suspend supply of power to the motor of the compressor in the free cooling mode.

In another embodiment, a method of operating a heating, ventilation, air conditioning, and/or refrigeration (HVAC&R) system includes supplying power to a motor of a compressor of a vapor compression system in response to a normal operating mode of the HVAC&R system, such that the compressor is driven by the motor and biases a refrigerant between an evaporator of the vapor compression system and a condenser of the vapor compression system. The method also includes disabling the power to the motor of the compressor of the vapor compression system in response to a free cooling mode of the HVAC&R system, such that a rotor of the compressor is levitated and enables the refrigerant to pass through the compressor.

In another embodiment, a chiller system includes a compressor configured to circulate a refrigerant through a refrigerant circuit, a motor of the compressor, and a controller configured to enable a supply of power to the motor of the compressor in response to a normal operating mode of the chiller system and disable the supply of power to the motor of the compressor in response to a free cooling mode of the chine system.

DRAWINGS

Various aspects of this disclosure may be better understood upon reading the following detailed description and upon reference to the drawings in which.

DETAILED DESCRIPTION

Figure 1:
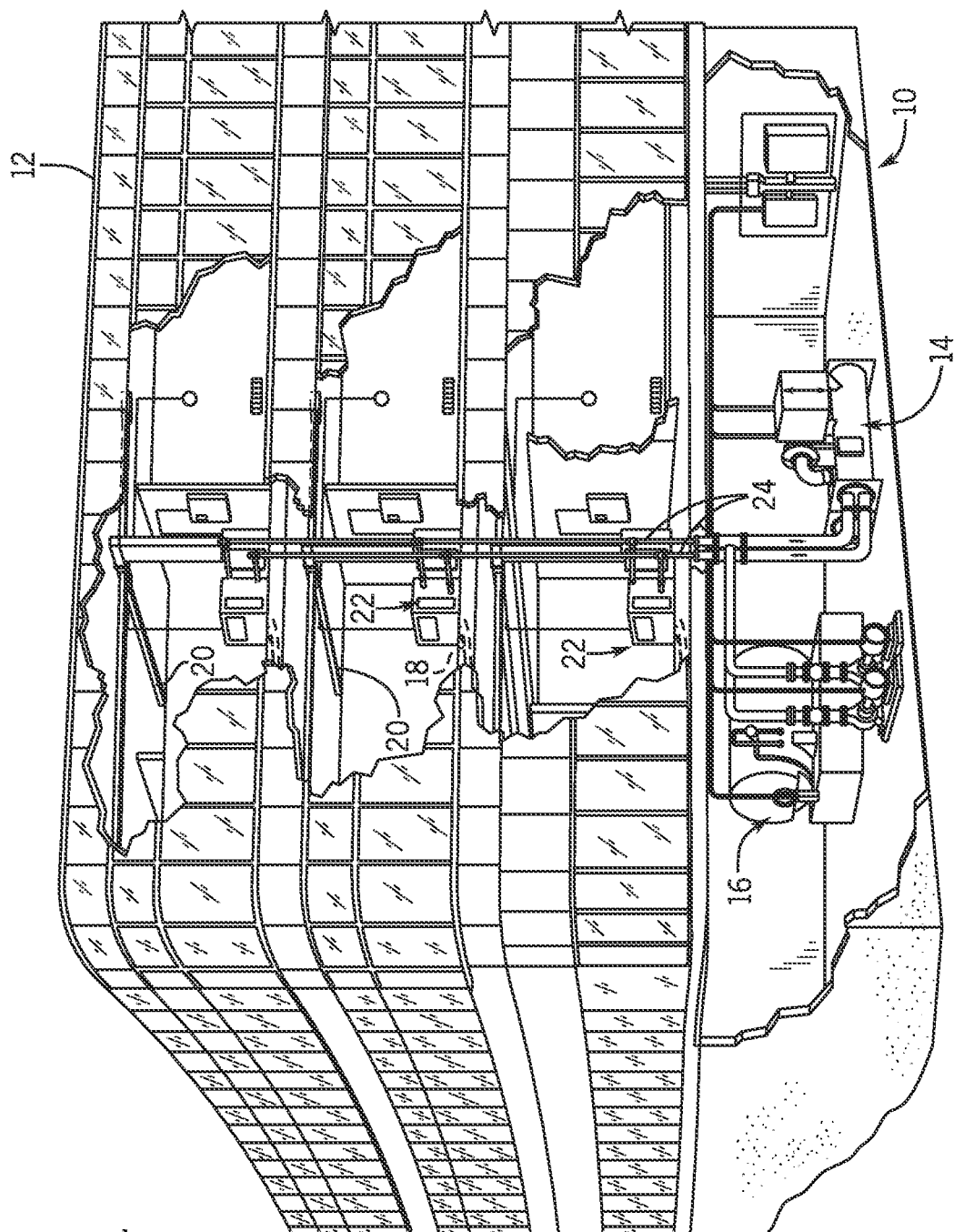
FIG. 1 is a perspective view of an embodiment of a building that may utilize a heating, ventilating, air conditioning, and/or refrigeration (HVAC&R) system in a commercial setting, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to a heating, ventilating, air conditioning, and/or refrigeration (HVAC&R) system utilizing a vapor compression system, referred to in certain instances below as a chiller or chiller system. More particularly, embodiments of the present disclosure relate to a free cooling mode or operation of the chiller.

The presently disclosed chiller includes a free cooling mode in which a passive (e.g., unpowered) compressor of the HVAC&R system receives refrigerant flow therethrough. That is, during the free cooling mode, a motor configured to drive rotation of the compressor may not be powered or operated. For example, the chiller is configured to circulate a working fluid (e.g., refrigerant) through the compressor, an evaporator, a condenser, and an expansion valve, among other possible components, of the chiller. The evaporator may place the refrigerant and a conditioning fluid (e.g., water) in a heat exchange relationship, such that the refrigerant absorbs heat from the conditioning fluid. The conditioning fluid may be circulated between the evaporator and a structure, such as a building, where the conditioning fluid is used to cool an air flow delivered to a conditioned space of the structure. In some embodiments, an air handling unit (AHU) of the HVAC&R system may receive the conditioning fluid from the chiller and utilize the conditioning fluid to cool the air flow delivered to the conditioned space. The conditioning fluid may then be returned to the evaporator to be cooled again.

The refrigerant may be circulated from the evaporator toward the compressor, which is powered in a normal operating mode of the chiller to increase a temperature and a pressure of the refrigerant before the refrigerant is delivered to the condenser. Upon receiving the refrigerant, the condenser places the refrigerant in a heat exchange relationship with a cooling fluid (e.g., water) circulated between the condenser and a cooling source, such as a cooling tower. The cooling fluid absorbs heat from the refrigerant in the condenser, causing a vapor form of the refrigerant to condense to liquid. The heated cooling fluid may be routed from the condenser to the cooling source (e.g., the cooling tower) to be cooled for delivery back to the condenser. For example, the cooling tower may utilize ambient air to cool the cooling fluid. Other cooling sources may also be possible, such as an underground cooling reservoir.

In certain conditions, for example during fall, winter, and/or spring seasons, the ambient air or other cooling medium may be relatively cool. The relatively cool ambient air may reduce a cooling demand of the chiller. Further, the relatively cool ambient air may cause the cooling fluid routed from the cooling source (e.g., cooling tower) to the condenser to be relatively cool. The cooling fluid having the relatively low temperature may cool and condense the refrigerant to such a degree that the chiller can provide adequate cooling capacity to the building (e.g., by way of the evaporator, as described above) without powering the compressor. An operating mode in which the compressor is not powered to compress the refrigerant and force the refrigerant through the vapor compression system may be referred to as free cooling or a free cooling mode.

In traditional chillers that employ free cooling techniques, refrigerant is directed to circumvent the compressor during free cooling conditions, such that the compressor does not cause substantial pressure loss that would otherwise reduce a cooling capacity of the chiller. In accordance with the present disclosure, a free cooling mode is employed in which the compressor is unpowered (e.g., a motor of the compressor is not operated) but the compressor is configured or designed to receive and direct the refrigerant therethrough. For example, the compressor may be configured such that a rotor of the compressor is levitated and spins freely in response to receiving the refrigerant while the motor of the compressor is not powered, thereby reducing, mitigating, or negating pressure losses that otherwise may be caused by the compressor. In one embodiment, the compressor may include magnetic bearings or, in oil-free systems, rolling element bearings that levitate the rotor of the compressor. Additionally or alternatively, a variable geometry diffuser (VGD) and/or pre-rotation vanes (PRVs) of the compressor may be opened in response to initiation of the free cooling mode.

By levitating the rotor of the compressor, opening the VGD and PRVs, and directing the refrigerant through the compressor while the compressor motor is not powered during the free cooling mode, a part count, complexity, and/or cost of the chiller system is substantially reduced compared to traditional systems that employ compressor bypass assemblies for free cooling operations. Further, the reduced part count, reduced complexity, and/or reduced cost of the chiller is achieved without incurring substantial pressure losses in the compressor. In this way, present embodiments enable both improved operation of chillers and a reduction in manufacturing, operating, and/or maintenance costs associated with chillers. Further still, the presently-described features enable use of a wide range of refrigerants (e.g., low, medium, and high pressure refrigerants), including R-123, R-514A, R-1224yd, R-1233zd, R-134a, R-1234ze, R-1234yf, R-1311, R-32, R-410A, and others. Other features, such as a falling-film evaporator, expansion valve throttling, refrigerant pumps, and others can be incorporated in the systems disclosed herein to improve cooling capacity and other aspects over traditional embodiments, and are described in detail below with reference to the drawings.

Turning now to the drawings, FIG. 1 is a perspective view of an embodiment of a heating, ventilating, air conditioning, and/or refrigeration (HVAC&R) system 10 in a building 12 for a typical commercial setting. The HVAC&R system may include a boiler 16 to supply warm liquid to heat the building 12 and a vapor compression system 14 to supply chilled liquid to cool the building 12. The vapor compression system 14, sometimes referred to as a chiller, may circulate a working fluid (e.g., refrigerant) that is cooled by a cooling fluid (e.g., liquid such as water) in a condenser of the vapor compression system 14, and that is heated by a conditioning fluid (e.g., liquid, such as water) in an evaporator of the vapor compression system 14. The cooling fluid may be provided by a cooling tower which cools the cooling fluid via, for example, ambient air. The conditioning fluid, cooled by the working fluid as noted above, may be utilized to cool an air flow provided to conditioned spaces of the building 12.

The HVAC&R system 10 may also include an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or the conditioning fluid (e.g., chilled liquid such as water) from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

The vapor compression system 14, or chiller, may include a compressor disposed between the above-described evaporator and condenser. The compressor may be operated in a normal operating mode, in which the compressor receives the working fluid (e.g., refrigerant) and is powered to increase a temperature and a pressure of the working fluid before the working fluid is delivered to the condenser. In accordance with the present disclosure, the compressor may be operated in a free cooling mode when the cooling fluid (or, stated differently, the ambient air utilized to cool the cooling fluid via the cooling tower) is at a low enough temperature that the vapor compression system 14 can provide adequate cooling capacity without powering a motor of the compressor to force the refrigerant through the vapor compression system 14.

For example, in the free cooling mode, the compressor receives the working fluid (e.g., refrigerant) but is not powered to force the refrigerant therethrough. Instead, the compressor is configured to enable the refrigerant to pass therethrough (e.g., via natural convection) in order to reduce or negate pressure losses in the compressor during the free cooling mode, the compressor may be a centrifugal compressor including a rotor that is levitated via one or more magnetic bearings or, in oil-free systems, one or more rolling element bearings. Further, a variable geometry diffuser (VGD) and/or pre-rotation vanes (PRV) of the centrifugal compressor may be opened in the free cooling mode to enable passive refrigerant flow therethrough. Thus, although a motor of the centrifugal compressor is not powered during the free cooling mode, the rotor of the centrifugal compressor may spin freely in response to receiving the refrigerant in the free cooling mode. By configuring the centrifugal compressor as described above, the free cooling mode can be utilized without the refrigerant bypassing the compressor while still enabling the vapor compression system 14 to provide adequate cooling capacity to the building 12. Accordingly, presently-contemplated embodiments enable effective free cooling while reducing part counts, pressure losses, and overall cost of traditional embodiments. Further, unlike traditional embodiments, presently-contemplated embodiments are compatible with a wide range of refrigerants, including R-123, R-514A, R-1224yd, R-1233zd, R-134a, R-1234ze, R-1234yf, R-1311, R-32, R-410A, and others.

Figure 2:
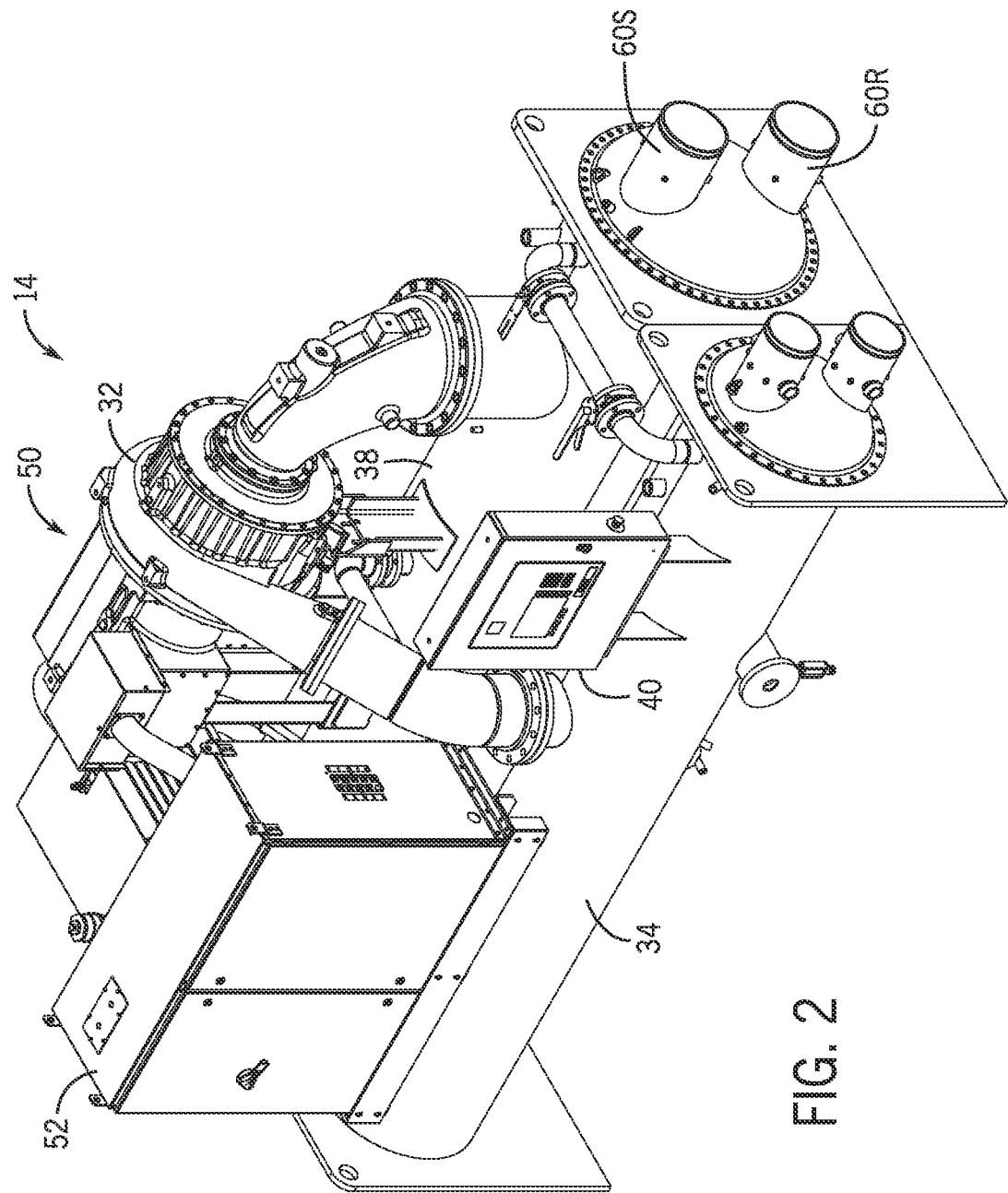
FIG. 2 is a perspective view of an embodiment of a vapor compression system, sometimes referred to as a chiller system, for use in the HVAC&R system of FIG. 1, in accordance with an aspect of the present disclosure.
Figure 3:
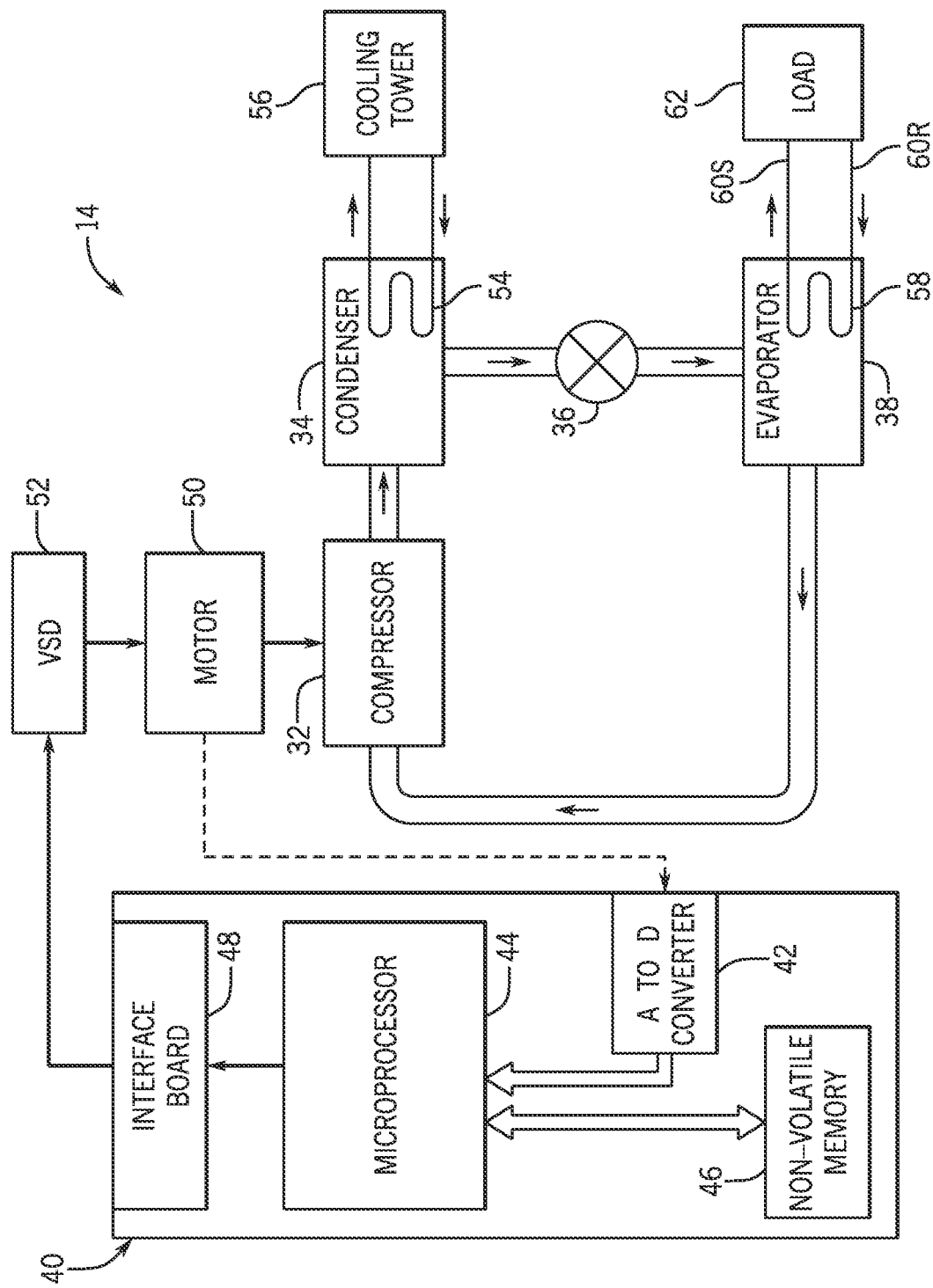
FIG. 3 is a schematic illustration of an embodiment of the vapor compression system of FIG. 2, in accordance with an aspect of the present disclosure.

FIGS. 2 and 3 are schematic illustrations of embodiments of the vapor compression system 14, or chiller, which can be used in the HVAC&R system 10 of FIG. 1. The vapor compression system 14 may circulate a refrigerant through a circuit starting with a compressor 32, such as a centrifugal compressor. The circuit may also include a condenser 34, an expansion valve(s) or device(s) 36, and an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R 410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. Other possible refrigerants include R-123, R-514A, R-1224yd, R-1233zd, R-134a, R-1234ze, R-1234yf, R-1311, R-32, and R-410A. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or device 36, and/or the evaporator 38. The motor 50 may drive the compressor 32 during a normal operating mode and may be powered by a variable speed drive (VSD) 52. The VSD 52 receives alternating current (AC) power during the normal operating mode, where the AC power includes a particular fixed line voltage and fixed line frequency from an AC power source, and provides power having a variable voltage and frequency to the motor 50, In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor. It should be noted that the motor 50 and/or the VSD 52 may be considered a part of the compressor 32. That is, in instances in the present disclosure describing the compressor 32 as not receiving power during a free cooling mode, it should be understood that the motor 50 and/or VSD 52 may not receive power. However, other components of the compressor 32, such as magnetic bearings configured to levitate a rotor of the compressor 32, may receive power in the free cooling mode.

During the normal operating mode, the compressor 32 compresses a refrigerant vapor and delivers the vapor to the condenser 34 through a discharge passage. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. The liquid refrigerant from the condenser 34 may flow through the expansion device 36 to the evaporator 38. In the illustrated embodiment of FIG. 3, the condenser 34 is water cooled and includes a tube bundle 54 connected to a cooling tower 56, which supplies the cooling fluid to the condenser 34.

The liquid refrigerant delivered to the evaporator 38 may absorb heat from a conditioning fluid that is subsequently routed to a load 62 (e.g., the building 12 of FIG. 1). That is, the conditioning fluid may be cooled by the refrigerant in the evaporator 38, and then may be utilized in the building 12 of FIG. 1 to condition an air flow provided to condition a space in the building 12. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to the cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

As previously described, the vapor compression system 14 may be operated in a free cooling mode in certain conditions, such as low ambient temperature conditions. For example, when the ambient temperature is below a temperature threshold, when the cooling fluid associated with the cooling tower 56 is below a temperature threshold, or When the refrigerant circulated through the vapor compression system 14 is below a temperature threshold, the vapor compression system 14 may be capable of providing adequate cooling capacity without powering the compressor 32 (or, stated differently, the motor 50 and/or the VSD 52 of the compressor 32). In accordance with present embodiments, the compressor 32 may include a centrifugal compressor having a levitated rotor. The rotor may be levitated via one or more magnetic bearings or, in an oil-free system, via one or more rolling element bearings. Further, a variable geometry diffuser (VGD), pre-rotation vanes (PRVs) of the compressor 32, and/or the expansion device 36 may be set to fully open positions in response to initiation of the free cooling mode. The levitated rotor, open VGD, open PRVs, and/or open expansion device 36 may enable an impeller of the compressor 32 to spin freely, despite not being powered, in response to receiving the refrigerant during the free cooling mode. In some embodiments, the expansion valve 36 may be throttled during the free cooling mode in order to maintain a condenser liquid level to improve available liquid head and reduce a submergence penalty in the evaporator 38. The condenser liquid level may be detected by a sensor 121 (FIG. 6) communicatively coupled to the controller 40, and the controller 10 may operate throttling of the expansion device(s) 36, 66 based on the liquid level in the condenser 34.

By enabling the refrigerant to pass through the compressor 32 during the free cooling mode and enabling the rotor of the compressor 32 to spin freely in response to receiving the refrigerant during the free cooling mode, a part count, complexity, and/or cost of the vapor compression system 14 (e.g., the chiller) may be reduced compared to traditional embodiments having compressor bypass features. For example, a compressor bypass valve or circuit included in traditional systems may be omitted. Further, the part count, complexity, and/or cost of the vapor compression system 14 may be reduced without incurring substantial pressure loss in the compressor 32 during the free cooling mode.

Figure 4:
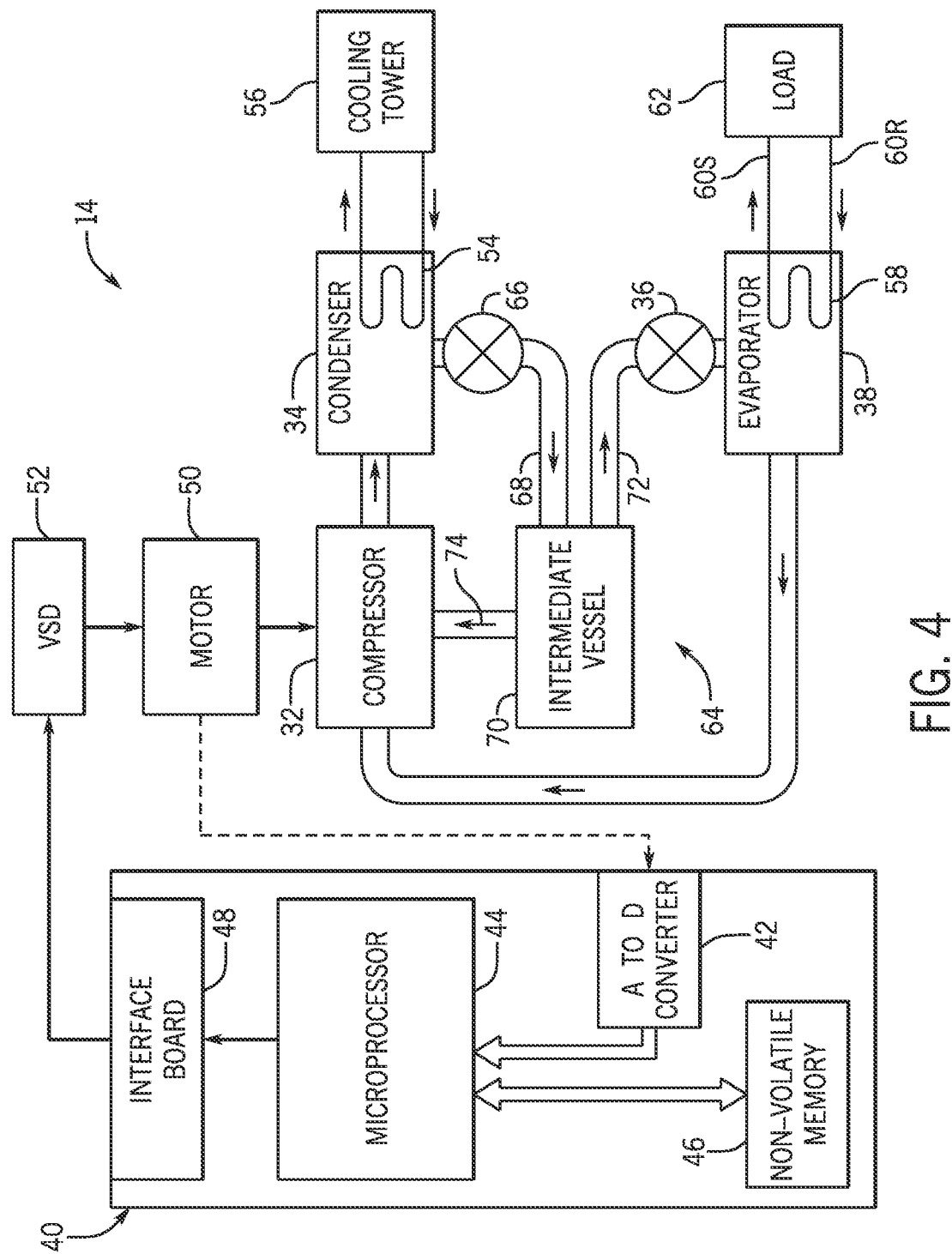
FIG. 4 is a schematic illustration of an embodiment of the vapor compression system of FIG. 2, in accordance with an aspect of the present disclosure.

FIG. 4 is a schematic illustration of an embodiment of the vapor compression system 14 with an intermediate circuit 64 incorporated between the condenser 34 and the expansion device 36. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 4, the inlet line 68 includes a first expansion device 66 positioned upstream of an intermediate vessel 70. In some embodiments, the intermediate vessel 70 may be a flash tank (e.g., a flash intercooler). In other embodiments, the intermediate vessel 70 may be configured as a heat exchanger or a "surface economizer." in the illustrated embodiment of FIG. 4, the intermediate vessel 70 is used as a flash tank, and the first expansion device 66 is configured to lower the pressure of (e.g., expand) the liquid refrigerant received from the condenser 34. During the expansion process, a portion of the liquid refrigerant may vaporize, and thus, the intermediate vessel 70 may be used to separate the vapor refrigerant from the liquid refrigerant received from the first expansion device 66. Additionally, the intermediate vessel 70 may provide for further expansion of the liquid refrigerant due to a pressure drop experienced by the liquid refrigerant when entering the intermediate vessel 70 (e.g., due to a rapid increase in volume experienced when entering the intermediate vessel 70). The vapor refrigerant in the intermediate vessel 70 may be drawn by the compressor 32 through a suction line 74 of the compressor 32. In other embodiments, the vapor refrigerant in the intermediate vessel 70 may be drawn to an intermediate stage of the compressor 32 (e.g., not the suction stage). The liquid refrigerant that collects in the intermediate vessel 70 may be at a lower enthalpy than the liquid refrigerant exiting the condenser 34 due to expansion of the refrigerant at the expansion device 66 and/or in the intermediate vessel 70. The liquid refrigerant from intermediate vessel 70 may then flow through line 72 and through a second expansion device 36 to the evaporator 38.

The vapor compression system 14 of FIG. 4 may be operated in a normal operating mode whereby the compressor 32 is powered (e.g., by way of powering the motor 50, the VSD 52, and the control panel 40 that controls the motor 50 and/or the VSD 52) to increase a pressure and a temperature of the refrigerant received by the compressor 32 from the evaporator 38 and/or the intermediate vessel 70. As described with respect to the vapor compression system 14 of FIG. 3, the vapor compression system 14 of FIG. 4 may also be operated, in accordance with the present disclosure, in a free cooling mode whereby the compressor 32 is not powered but still enables flow of the refrigerant therethrough. As described in detail below with reference to FIG. 5, the compressor 32 (e.g., an impeller of the compressor 32) may be configured to spin freely in response to receiving the refrigerant during the free cooling mode.

Figure 5:
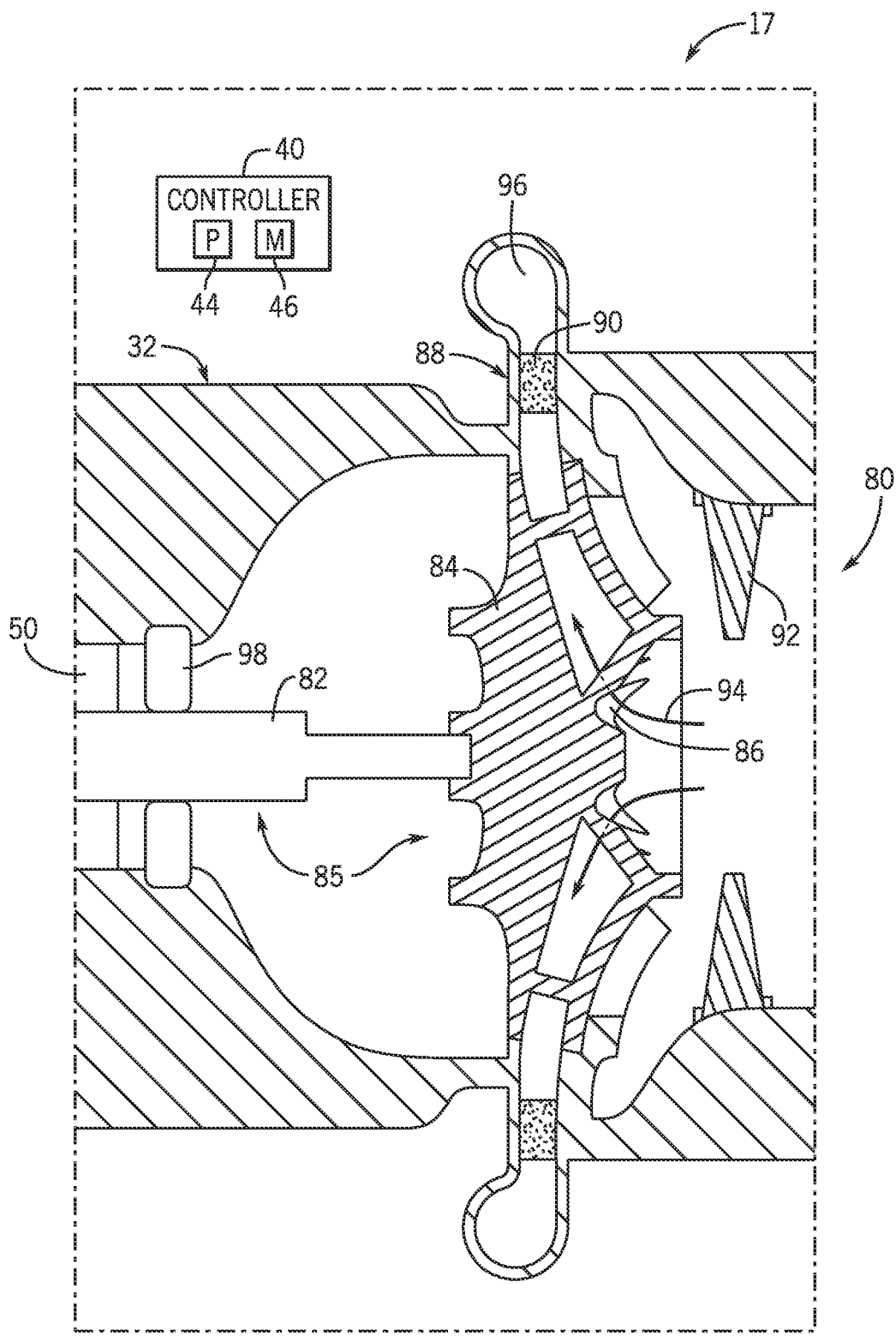
FIG. 5 is a schematic illustration of an embodiment of a portion of the vapor compression system of FIG. 2, including a controller and cross-section of a portion of a compressor, in accordance with an aspect of the present disclosure.

FIG. 5 is a schematic illustration of an embodiment of a portion of the vapor compression system 14 of FIG. 2, illustrating the control panel 40 (e.g., a controller) and a cross-section of a portion of the compressor 32. The illustrated compressor 32 is a centrifugal compressor suitable for operation in the disclosed free cooling mode, although other types of compressors may be utilized with the present techniques.

The compressor 32 may be operated in a normal operating mode whereby the control panel 40 powers the compressor 32 (e.g., via the motor 50 and/or a VSD corresponding to the compressor 32) as the compressor 32 receives refrigerant at a suction side 80 (e.g., inlet) of the compressor 32. In the normal operating mode, the compressor 32 operates to increase a pressure and a temperature of the refrigerant before delivering the refrigerant to, for example, the condenser 34 of the vapor compression system 14. For example, the motor 50 may cause a shaft 82 of the compressor 32 to rotate. The shaft 82 may be coupled to an impeller 84 having vanes or blades 86. The shaft 82 and the impeller 84, among other features driven into rotation by the motor 50 via the shaft 82, may collectively be referred to as a rotor 85 of the compressor 32. As the compressor 32 receives the refrigerant and the rotor 85 is driven into rotation by the motor 50 during the normal operating mode, the rotating blades 86 of the impeller 84 may gradually increase an energy of the refrigerant, which passes toward a diffuser 88 of the compressor 32. The diffuser 88 converts the kinetic energy of the refrigerant into pressure by reducing a velocity of the refrigerant. For example, the illustrated diffuser 88 is a variable geometry diffuser (VGD) having a diffuser ring 90 that can be controlled via the control panel 40 to open or restrict a refrigerant flow path through the diffuser 88 to various degrees based on desired operating parameters and/or performance of the compressor 32. The illustrated compressor 32 also includes pre-rotation vanes 92 disposed upstream of the impeller 84 with respect to a flow 94 of the refrigerant through the compressor 32. After passing through or across the pre-rotation vanes 92, the impeller 84, and the diffuser 88, the pressurized refrigerant may be accumulate in a collector 96 for subsequent distribution of the pressurized refrigerant to a downstream component of the vapor compression system, such as the condenser 34 in FIGS. 2-4.

As previously described, and in accordance with the present disclosure, the vapor compression system 14 may be operated in a free cooling mode whereby the compressor 32 receives refrigerant but is not powered (e.g., driven into rotation). While the vapor compression system 14 is operated in the free cooling mode, the compressor 32 (e.g., the impeller 84) is configured to spin freely in response to receiving the refrigerant. For example, the illustrated compressor 32 includes one or more bearings 98 that may be magnetic bearings or, in oil-free systems, rolling element bearings. By including magnetic bearings or, in oil-free systems, rolling element bearings, the rotor 85 may be levitated and enabled to spin freely in response to receiving refrigerant while the compressor 32 (e.g., the motor 50 and/or corresponding VSD 52 of the compressor 32) is not powered by the control panel 40. Further, when the control panel 40 initiates or operates the free cooling mode, the control panel 40 may adjust the pre-rotation vanes 92 and the variable geometry diffuser 88 to an open position (e.g., a fully open position), thereby reducing or negating pressure loss in the refrigerant during operation of the vapor compression system 14 in the free cooling mode.

Figure 6:
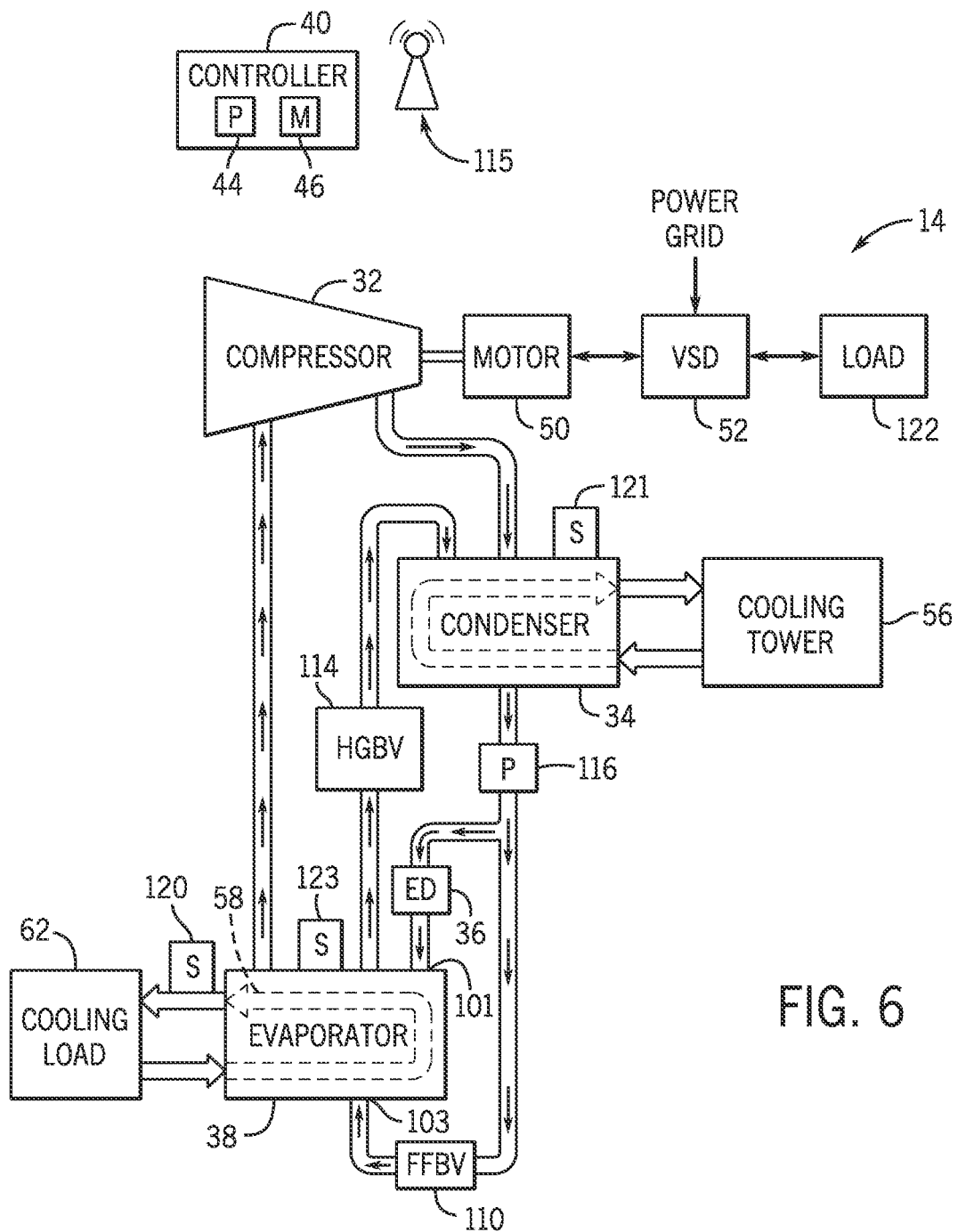
FIG. 6 is a schematic illustration of an embodiment of the vapor compression system of FIG. 2, in accordance with an aspect of the present disclosure.

FIG. 6 is a schematic illustration of an embodiment of the vapor compression system 14 of FIG. 2. In the illustrated embodiment, the vapor compression system 14 includes similar features as those presented in FIG. 4, but without the intermediate vessel. However, the vapor compression system 14 in FIG. 6 also includes a liquid pump 116 disposed between the condenser 34 and the evaporator 38, and a hot-gas bypass valve 114 (HGBV). Further, the evaporator 38 in FIG. 6 is a falling-film evaporator, and the vapor compression system 14 (i.e., chiller) may include a bypass valve 110 operable to direct refrigerant to various portions of the evaporator 38 (e.g., falling-film evaporator) depending on operating conditions.

As previously described, refrigerant may be directed to the evaporator 38 (e.g., falling-film evaporator) and may be utilized to cool a conditioning fluid routed to and from the load 62. The load 62 may be, for example, one or more air handling units (AHUs) which utilize the cooled conditioning fluid to cool an air flow provided to a conditioned space. In general, the evaporator 38 (e.g., falling-film evaporator) may be configured to receive the refrigerant toward a top of the evaporator 38, for example at an upper inlet 101, such that the refrigerant is Gravity-fed downwardly from the upper inlet 101 and through the evaporator 38. During certain conditions, the pressure of the refrigerant may be such that the refrigerant cannot be moved to the top of the evaporator 38, or such that the system 14 would otherwise suffer (e.g., pressure losses, cooling capacity, etc.) if the refrigerant were moved to the top of the evaporator 38 to operate the evaporator 38 as a falling-film evaporator. During these conditions, the falling-film bypass valve 110 may be operated (e.g., opened) to enable the refrigerant to travel toward a bottom of the evaporator 38, for example into a lower inlet 103. For example, the control panel 10 may instruct (e.g., via a wired connection or via a wireless connection over a network 115) opening and/or closing of the falling-film bypass valve 110, for example based on a refrigerant pressure detected by a sensor 123 communicatively coupled to the control panel 40. Thus, when the falling-film bypass valve 110 is actuated to divert the refrigerant from the upper inlet 101 to the lower inlet 103, the evaporator 38 may be operated as a flooded evaporator. It should be noted that, in another embodiment, the falling-film bypass valve 110 may be located differently than shown and may be closed to divert the refrigerant from the upper inlet 101 to the lower inlet 103 of the evaporator 38.

As previously described, the vapor compression system 14 may also include the HGBV 114. The HGBV 114 may be operated (e.g., opened) to enable vapor refrigerant to pass from the evaporator 38 toward and into the condenser 34. Opening the HGBV 114 to enable the vapor refrigerant to pass to the condenser 34 may increase a cumulative refrigerant flow path area or size of the vapor compression system 14 and improve cooling capacity of the vapor compression system 14. In some embodiments, the HGBV 114 may be opened in response to initiation of free cooling operation.

Further, in certain embodiments, the vapor compression system 14 may include the liquid pump 116, which may be operated (e.g., powered) during the free cooling operation to move liquid refrigerant from the condenser 34 to the evaporator 38. The pump 116 may eliminate the need for the falling-film bypass valve 110 and lower inlet 103 and the associated piping. However, in certain embodiments, the vapor compression system 14 may operate as a thermosiphon whereby natural convection moves heated liquid refrigerant upwardly within the vapor compression system 14 as it is replaced by cooler liquid refrigerant flowing downwardly via gravity.

In embodiments without the pump 116, the inclusion of the falling-film bypass valve 110 and corresponding features may be preferred. The falling-film bypass valve 110 may be required for free-cooling operation if the condenser 34 is physically lower than the upper inlet 101 so that Gravity cannot provide sufficient flow of liquid refrigerant.

Other features may be incorporated and/or utilized with the vapor compression system 14 (and corresponding free cooling operation) described herein. For example, a capacity of the vapor compression system 14 may be modulated based on feedback regarding a temperature of the conditioning fluid. More specifically, the control panel 40 may monitor a temperature of the conditioned fluid exiting the evaporator 38. A sensor 120 may detect the temperature of the conditioned fluid exiting the evaporator 38 and may be communicatively coupled to the control panel 40, which periodically receives temperature data and modulates capacity of the vapor compression system 14 based on the detected temperature. It should be noted that the sensor 120, or a separate sensor, may also be utilized to determine when to initiate the free cooling operation. For example, free cooling operation may be initiated during cooler seasons (e.g., fall, winter, and/or spring) based on an ambient temperature detected by a sensor, and/or based on a cooling fluid temperature detected by a sensor. As previously described, the vapor compression system 14 may be capable of operating at a capacity suitable for meeting a cooling demand during relative cool seasons without powering and driving rotation of the compressor 32. The control panel 40 may include a temperature threshold stored in the memory 46. The temperature threshold may relate to a temperature of the conditioning fluid leaving the evaporator 38 (e.g., as detected by the sensor 120), an ambient air temperature, a temperature of the cooling fluid routed to and from the cooling tower 56, a refrigerant temperature (e.g., detected at a selected location along the vapor compression system 14), or a combination thereof. When a detected temperature corresponding to the temperature threshold falls below the temperature threshold, the control panel 40 may initiate free cooling operation.

Further to these features, in certain conditions, the motor 50 may be operated as a generator during the free cooling mode. For example, while the control panel 40 may terminate power supplied to the motor 50 (or the VSD 52, which may be considered a part of the motor 50 and/or the compressor 32) during the free cooling mode, the kinetic energy of the free spinning compressor 32 during the free cooling mode (e.g., induced by the passive refrigerant flow directed therethrough) may be harnessed and utilized to generate energy via the motor 50 or a separate generator coupled to the rotor 85 of the compressor 32. Accordingly, the motor 50 may be coupled to a load 122 via the VSD 52 (e.g., an electrical system, a battery, a capacitor, a utility grid, etc.), and the load 122 may utilize or store electrical energy generated in or by the motor 50 during the free cooling mode.

Further, as previously described, the expansion device 36 (or some other expansion device of the system 14) may be throttled during free cooling operation in order to maintain a condenser liquid level to improve available liquid head and reduce a submergence penalty in the evaporator 38. The condenser liquid level may be detected by the sensor 121 wire or wirelessly communicatively coupled to the controller 40, and the controller 40 may operate throttling of the expansion device 36 based on the liquid level in the condenser 34.

Figure 7:
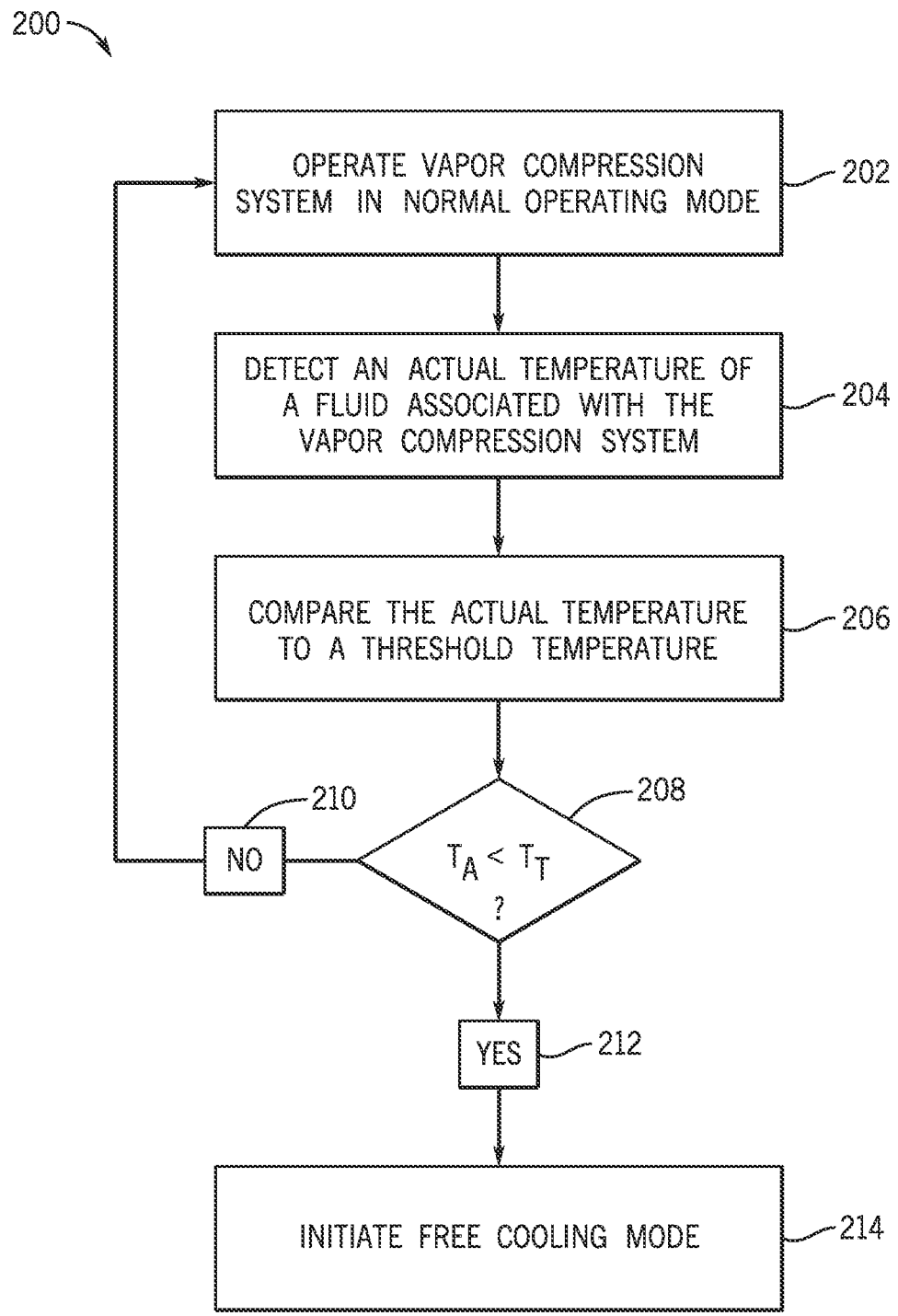
FIG. 7 is a process flow diagram illustrating an embodiment of a method of operating the vapor compression system of FIG. 2, in accordance with an aspect of the present disclosure.

FIG. 7 is a process flow diagram illustrating an embodiment of a method 200 of operating the vapor compression system 14 of FIG. 2. The method 200 includes operating (block 202) the vapor compression system 14 in a normal operating mode whereby the compressor 32 (or motor 50 or VSD 52 thereof) is powered, receives refrigerant, and increases a temperature and a pressure of the refrigerant prior to delivery of the refrigerant to the condenser 34.

The method 200 also includes detecting an actual temperature of a fluid associated with the vapor compression system 14. As previously described, the fluid may be ambient air (e.g., utilized by cooling tower 56 to cool a fluid that subsequently extracts heat from the refrigerant in the condenser 34), a fluid passed between the cooling tower 56 and the condenser 34, a fluid passed between the evaporator 38 and the load 62 (e.g., air handling unit), or the refrigerant. As will be described below, the detected actual temperature of the fluid may be utilized to determine whether operation in the free cooling mode is desired. However, in certain embodiments, the vapor compression system 14 may be manually operated to initiate the free cooling mode.

The illustrated method 200 also includes comparing (block 206) the actual temperature discussed above with respect to block 204 to a threshold temperature. For example, as shown, the method 200 includes determining (block 208) whether the actual temperature is less than the threshold temperature. If the actual temperature is not less than the threshold temperature (block 210), normal operation of the vapor compression system 14 may continue. If the actual temperature is less than the threshold temperature (block 212), then the free cooling mode is initiated (block 214).

As previously described, in the free cooling mode, power to the compressor 32. (e.g., to the motor 50 or VSD 52 of the compressor 32) is terminated. However, the compressor 32 is still configured to receive and direct refrigerant flow therethrough. In other words, the refrigerant flow does not bypass the compressor 32 in the free cooling mode. The compressor 32 is configured to spin freely during the free cooling mode (e.g., in response to receiving the refrigerant). In order to improve efficiency during the free cooling mode, the compressor 32 may include features that enable a reduction in pressure loss that would otherwise be caused by the compressor 32 during the presently-disclosed free cooling mode. For example, a VGD (e.g., diffuser 88) of the compressor 32 may be set to an open (e.g., fully open) position, PRV's 92 of the compressor 32 may be set to an open (e.g., fully open) position, an expansion valve (e.g., valve 36) of the vapor compression system 14 may be set to an open (e.g., fully open) position, or any combination thereof. However, in certain embodiments, the expansion valve 36 may be throttled during the free cooling mode in order to maintain a condenser liquid level to improve available liquid head and reduce a submergence penalty in the evaporator 38. Further, in certain embodiments, the falling-film bypass valve 110 may be included and operated to divert the refrigerant, in response to certain operating conditions, from the upper inlet 101 to the lower inlet 103, described in detail with respect to FIG. 6. Further still, the HGBV 114 may be included and operated to enable vapor refrigerant to pass from the evaporator 38 to the condenser 34 during the free cooling mode. Finally, the motor 50 may be operated in the free cooling mode as a generator in order to generate convert kinetic energy of the free spinning compressor 32 into electrical energy.

While only certain features of present embodiments have been illustrated and described herein, many modifications and changes will occur to those skilled in the art. It is, therefore, to be understood that the appended claims are intended to cover all such modifications and changes that fall within the true spirit of the disclosure. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for performing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A heating, ventilation, air conditioning, and/or refrigeration (HVAC&R) system, comprising:
   a vapor compression system comprising an evaporator, a condenser, and a compressor, wherein the compressor comprises an impeller and the compressor is configured to guide a refrigerant through the impeller in a normal operating mode of the vapor compression system and in a free cooling mode of the vapor compression system; and
   a controller configured to enable a supply of power to a motor of the compressor in the normal operating mode and to suspend the supply of power to the motor of the compressor in the free cooling mode.

2. The HVAC&R system of claim 1, wherein the compressor comprises a levitated rotor.

3. The HVAC&R system of claim 1, wherein the compressor comprises:
   a variable geometry diffuser (VGD), and the controller is configured to instruct the VGD to a fully open VGD position in response to initiation of the free cooling mode; or
   pre-rotation vanes (PRVs), and the controller is configured to instruct the PRVs to a fully open PRVs position in response to initiation of the free cooling mode.

4. The HVAC&R system of claim 1, wherein the compressor comprises a variable speed drive (VSD) configured to provide power to the motor, and the controller is configured to control the VSD to enable the supply of power to the motor in the normal operating mode and to control the VSD to suspend the supply of power to the motor in the free cooling mode.

5. The HVAC&R system of claim 1, comprising a temperature sensor configured to detect a temperature of the refrigerant, of a conditioning fluid directed through the evaporator, of a cooling fluid directed through the condenser, or of ambient air, wherein the controller is configured to receive data indicative of the temperature from the temperature sensor, and wherein the controller is configured to initiate the free cooling mode in response to a determination that the temperature is less than a threshold temperature value.

6. The HVAC&R system of claim 1, comprising a refrigerant pump, wherein the controller is configured to activate the refrigerant pump in response to initiation of the free cooling mode to cause the refrigerant pump to force at least a liquid phase of the refrigerant through the vapor compression system.

7. The HVAC&R system of claim 1, wherein the motor is configured to convert kinetic energy of a rotor of the compressor to electrical energy during the free cooling mode.

8. The HVAC&R system of claim 1, wherein the compressor is configured to receive a vapor portion of the refrigerant from the evaporator in the normal operating mode and in the free cooling mode.

9. The HVAC&R system of claim 2, wherein the compressor comprises a magnetic bearing, the levitated rotor is levitated via the magnetic bearing, and the controller is configured to enable an additional supply of power to the magnetic bearing in the free cooling mode.

10. The HVAC&R system of claim 2, wherein the compressor comprises a rolling element bearing, and the levitated rotor is levitated via the rolling element bearing.

11. A method of operating a heating, ventilation, air conditioning, and/or refrigeration (HVAC&R) system, comprising:
    supplying power to a motor of a compressor of a vapor compression system in response to a normal operating mode of the HVAC&R system, such that the compressor is driven by the motor and biases a refrigerant between an evaporator of the vapor compression system and a condenser of the vapor compression system;
    disabling the power to the motor of the compressor of the vapor compression system in response to a free cooling mode of the HVAC&R system, such that a rotor of the compressor is levitated; and
    enabling the refrigerant to pass through an impeller of the compressor during the normal operating mode and the free cooling mode of the HVAC&R system.

12. The method of claim 11, comprising levitating the rotor of the compressor via a magnetic bearing.

13. The method of claim 11, comprising levitating the rotor of the compressor via a rolling element bearing.

14. The method of claim 11, comprising converting kinetic energy of the rotor of the compressor to electrical energy.

15. The method of claim 11, comprising receiving, via the compressor, a vapor portion of the refrigerant from the evaporator in the normal operating mode and in the free cooling mode.

16. A chiller system, comprising:
    a compressor configured to receive a vapor portion of a refrigerant corresponding to a refrigerant circuit from an evaporator during a normal operating mode of the chiller system and a free cooling mode of the chiller system;

a motor of the compressor; and a controller configured to enable a supply of power to the motor of the compressor in response to the normal operating mode of the chiller system and disable the supply of power to the motor of the compressor in response to the free cooling mode of the chiller system.

17. The chiller system of claim 16, wherein the compressor comprises a rotor levitated by a magnetic bearing or a rolling element bearing.

18. The chiller system of claim 16, comprising a temperature sensor configured to detect a temperature of the refrigerant, of a conditioning fluid directed through the evaporator, of a cooling fluid directed through a condenser, or of ambient air, wherein the controller is configured to receive data indicative of the temperature from the temperature sensor, and wherein the controller is configured to initiate the free cooling mode in response to a determination that the temperature is less than a threshold temperature value.

19. The chiller system of claim 16, wherein the motor is configured to convert kinetic energy of a rotor of the compressor to electrical energy during the free cooling mode.

20. The chiller system of claim 16, wherein the compressor comprises an impeller and the compressor is configured to guide the refrigerant through the impeller in the normal operating mode and in the free cooling mode.

* * * * *